United States Patent [19]

Schwochow

[11] Patent Number: 5,203,917
[45] Date of Patent: Apr. 20, 1993

[54] BISMUTH VANADATE PIGMENTS, A PROCESS FOR THEIR PREPARATION AND THEIR USE

[75] Inventor: Friedrich Schwochow, Leverkusen, Fed. Rep. of Germany

[73] Assignee: Bayer Aktiengesellschaft, Leverkusen-Bayerwerk, Fed. Rep. of Germany

[21] Appl. No.: 803,573

[22] Filed: Dec. 9, 1991

[30] Foreign Application Priority Data

Dec. 20, 1990 [DE] Fed. Rep. of Germany ....... 4040849

[51] Int. Cl.$^5$ .............................................. C04B 14/00
[52] U.S. Cl. ..................................... 106/479; 106/451
[58] Field of Search ................................. 106/479, 451

[56] References Cited

U.S. PATENT DOCUMENTS

| 4,752,460 | 6/1988 | Herren | 423/593 |
| 4,937,063 | 6/1990 | Sullivan | 423/593 |
| 5,123,965 | 6/1992 | Herren et al. | 106/462 |

FOREIGN PATENT DOCUMENTS

| 0239526 | 9/1987 | European Pat. Off. . |
| 0304399 | 8/1989 | . |
| 1106898 | 5/1961 | Fed. Rep. of Germany . |

Primary Examiner—Karl Group
Assistant Examiner—Chris Gallo
Attorney, Agent, or Firm—Connolly & Hutz

[57] ABSTRACT

Bismuth vanadate pigment in the form of the tetragonal crystal structure of Scheelite useful in coloring lacquers and synthetic plastics or resins containing 0.1 to 0.3 mol $ZrO_2$ (per mol of $BiVO_4$) is prepared by heat treating mixed precipitates of aqueous solutions of bismuth, vanadate and zirconium salts, followed by washing, drying and grinding to pigment fineness.

4 Claims, No Drawings

BISMUTH VANADATE PIGMENTS, A PROCESS FOR THEIR PREPARATION AND THEIR USE

The present invention relates to new bismuth vanadale pigments, to a process for their preparation and to their use.

BACKGROUND OF THE INVENTION

Inorganic pigments containing cadmium, lead and chromium-(VI) have in recent years increasingly been regarded as harmful on ecological and toxicological grounds. In a search for alternative products, systems containing bismuth oxide in particular have been tested for their coloristic properties.

Among these, $BiVO_4$, which also occurs as a mineral and the technical production of which is described in DE-C 422 947, has been in the forefront of these investigations. The method described there, precipitation of bismuth nitrate with alkali metal vanadate solution followed by calcination of the precipitated gel, has been further developed in DE-A 2 727 864 to provide a process for the preparation of a luminous, primrose coloured bismuth vanadate with pigment properties. Multiphase pigments containing additives such as silicates, phosphates or sulphates have also been developed with a view to reducing the cost of bismuth vanadate which is in itself expensive. These pigments are described in German Offenlegungs-schriften DE-A 2 933 778 ($BiVO_4$ -$BiPO_4$-$AlPO_4$), DE-A2 940 185 ($BiVO_4$ - $BiPO_4$- MeO) and DE-A 3 004 083 ($BiVO_4$ - $BaSO_4$).

Modifications of the $BiVO_4$ structure by the incorporation of foreign ions into the lattice have also been carried out for improving the technical pigment properties. Bismuth vanadate pigments containing molybdenum and tungsten belong to the state of the art in this field (DE-A 3 106 625, DE-A 3 135 281, DE-A 3 221 338, EP-A 74 049 and EP-A 239 526). The products disclosed contain mixtures of structurally modified $BiVO_4$ and Bi-molybdates and alkaline earth metal tungstates.

In order to assess the new class of substances claimed in the present invention by comparison with the structures known in the art, it is necessary to distinguish between four different main modifications of $BiVO_4$: $BiVO_4$ occurring naturally as the mineral pucherite has an orthorhombic structure - space group Pnca with $a_o=5.33Å$, $b_o=5.05Å$ and $c_o=12,00Å$ (J. Granzin and D. Pohl, Z. f. Kristallografie, 169, 289–294 (1984) and thus differs substantially from the basic synthetic type which crystallises in a monoclinically distorted variation of the $CaWO_4$ lattice (Scheelite type) with the space group I 2/a (W. I. F. David and A. M Glazer, Phase Transitions, Vol. 1 (1979) 155-170). For increasing the stability of the synthetic bismuth vanadate lattice, however, it is the pure tetragonal modification of space group I $4_1$/a which is required. This tetragonal $BiVO_4$ with Scheelite structure is obtained in the presence of the above mentioned foreign ions such as Mo or W, alone or in combination with alkaline earth metal ions. According to H. Wienand and W. Ostertag (The Bulletin of the Bismuth Institute, 53 (1988) 1–4), $BiVO_4$ prepared in the presence of sodium molybdate has a tetragonal structure with the lattice constants $a_o=5.147Å$ and $c_o=11.722Å$.

Zhang Wenpu et al (The Bulletin of the Bismuth Institute, 56 (1988) 11) proved that the monoclinic phase changes into the required tetragonal phase if Mo or W is added in the process of synthesis. The particulars given in Patent Specification EP-B 239 526 also indicate that the Mo- and W-containing types of $BiVO_4$ claimed there have the tetragonal Scheelite type crystal structure.

There is another tetragonal $BiVO_4$ modification which must be distinguished from the Scheelite type. This modification crystallises in the zirconium type ($ZrSiO_4$ structure of space group I $4_1$/amd) but is unsuitable as pigment on account of its much paler yellow.

None of the above-mentioned synthetic $BiVO_4$ structures, however, have sufficient resistance to alkaline attack or exposure to heat for technical use as pigments; these resistances are basic requirements, for example for the incorporation of the pigment in plastics. Moreover, all these pigments are more or less sensitive to light, with the disadvantageous result that they are subject to greying, e.g. when used in lacquers.

It is an object of the present invention to provide bismuth vanadate pigments which are free from the above-described disadvantages.

BRIEF DESCRIPTION OF THE INVENTION

Bismuth vanadate Pigment, in the form of the tetragonal crystal structure of Scheelite, useful in coloring lacquers and synthetic plastics containing 0.1 to 0.3 mol $ZrO_2$ (per mol of $BivO_4$) is prepared by heat treating mixed precipitates of aqueous solutions of bismuth, vanadate and zirconium salts, followed by washing, drying and grinding to pigment fineness.

DETAILED DESCRIPTION

It has surprisingly been found that zirconium-containing $BiVO_4$ gels can be precipitated from the aqueous Phase and are converted into the tetragonal Scheelite structure of the $BiVO_4$ lattice when subsequently calcined, the Zr ions being randomly distributed over Bi locations. This was all the more unexpected since experiments for the stabilizing incorporation of $ZrO_2$ in the $BiVO_4$ structure by the thermal method with direct reaction of the solid substances merely gives rise to mixtures of monoclinic $BiVO_4$ with $ZrO_2$ (DE-A 1 106 898).

The present invention thus relates to bismuth vanadate pigments which are characterised in that they contain from 0.1 to 0.3 mol of $ZrO_2$ per mol of $BiVO_4$ and are present in the tetragonal crystal structure of Scheelite.

The pigments according to the invention consist of the pure, monophasic, tetragonal, Scheelite type $BiVO_4$ structure with space group I $4^1$/a and lattice constants of $a_o=5.12$ to $5.16Å$ and $c_o=11.63$ to $11.67Å$, and structural investigations by X-ray powder diffractometry by the Rietveld process show the Zr arranged on Bi locations.

The group of substances according to the invention is characterised by, for example, the X-ray powder data shown in Table 1.

TABLE 1

X-ray powder data (radiation $Cu_{K\alpha}$) of tetragonal, Zr-containing $BiVO_4$

| (hkl) | d-value | 2-θ | Int |
|---|---|---|---|
| 101 | 4.695981 | 18.8877 | 34.2 |
| 112 | 3.081228 | 28.9540 | 100.0 |
| 004 | 2.915221 | 30.6420 | 14.0 |
| 200 | 2.564547 | 34.9581 | 13.3 |
| 211 | 2.252512 | 39.9933 | 14.5 |
| 105 | 2.121466 | 42.5800 | 6.6 |

TABLE 1-continued

X-ray powder data (radiation $Cu_{K\alpha}$) of tetragonal, Zr-containing $BiVO_4$

| (hkl) | d-value | 2-θ | Int |
|---|---|---|---|
| 213 | 1.975891 | 45.8890 | 7.9 |
| 204 | 1.922808 | 47.2316 | 17.8 |
| 220 | 1.816907 | 50.1686 | 10.0 |
| 116 | 1.713723 | 53.4203 | 9.9 |
| 215 | 1.638945 | 56.0667 | 6.5 |
| 312 | 1.564262 | 59.0000 | 16.2 |
| 224 | 1.541170 | 59.9738 | 8.1 |

The invention also relates to a process for the preparation of the bismuth vanadate pigments according to the invention. This characterised in that mixed precipitates of aqueous bismuth, vanadate and zirconium salt solutions which have been separated off, washed and dried are subjected to a temperature treatment and then ground down to pigment fineness.

The preferred starting material for the preparation of the substances according to the invention are zirconium-containing bismuth vanadate gels prepared from aqueous Bi-Zr salt solutions with alkaline vanadate solutions.

Any $Bi^{3+}$ or $Zr^{4+}$ salt may be used as the source of bismuth or zirconium but bismuth nitrate and zirconium sulphate are preferably used for the present invention.

The vanadium component is added in the form of alkali metal vanadate solutions, which are generally prepared by dissolving $V_2O_5$ powder in the appropriate quantity of alkali metal hydroxide, preferably NaOH or KOH, but commercially available vanadates such as $Na_3VO_4$ or $K_3VO_4$ may equally well be used.

The gels used as starting material may be prepared by, for example, introducing the solution of the zirconium salt or the solid salt itself into a receiver containing an acid Bi salt solution and then precipitating the resulting mixed solution by adjustment of the pH to a range of preferably from 2.5 to 6.5 by the addition of the required quantity of alkali metal vanadate solution. The precipitated gels are then preferably stirred intensively and homogenised and subsequently separated from their mother liquors by filtration, centrifuging or decanting. The gels are then washed and dried. Drying may be carried out in conventional drying apparatus such as drying cupboards, belt driers, roller driers or spray driers.

The zirconium-containing amorphous bismuth vanadate starting substances are then annealed. Annealing may be carried out in conventional apparatus such as muffle furnaces, shaft furnaces or rotary tubular or drum kilns.

Annealing of the starting substances is preferably carried out at temperatures of from 250° to 550° C. for periods from 0.5 to 16 hours. If pure products are to be prepared, the reaction is preferably carried out at temperatures from 350° to 450° C. for an annealing time of from 0.5 to 4 hours. If the temperatures are too low or the annealing times too short, the reaction products obtained may still contain amorphous constituents. Conversely, annealing carried out for too long or at temperatures which are too high results in foreign phases of substances discoloured to a dirty brownish green.

After annealing the substances according to the invention are worked up by various processes, depending on their intended use. The grinding process in particular carried out in mortar mills, cross beater mills, ball mills or sand mills, and the subsequent step of washing for removal of the excess salts from the neutralisation reaction must be adapted to the particular purpose, as is known in the art of pigment production. The usual method employed in the pigment industry of working up the furnace clinker by wet grinding in ball mills results, for example, in products having surface areas (according to BET) of from 5 to 30 $m^2/g$ and particles up to 60% of which have diameters <1.5 μm.

The colour shade of the particles according to the invention depends on the zirconium content and the particle size but the limits of the a*- and b*-values in the colour field (determined according to DIN 6174 in Alkydal ® F 48 lacquer Purton with 10% PVC) may be stated as follows:

a* = 5 to −12 b* = 75 to 90.

The zirconium-containing tetragonal bismuth vanadate pigments according to the invention are suitable for use as luminous yellow substances mainly for the pigment industry as pigments for lacquers and other paints and for colouring synthetic plastics and resins.
Alkyldal ® = alkyl resin of Bayer AG The present invention thus also relates to the use of the bismuth vanadate pigments according to the invention for colouring lacquers and synthetic plastics and resins.

The following Examples serve to illustrate the invention in more detail without limiting the invention.

EXAMPLE 1

167.3 g of $Bi(NO_3)_3 \cdot 5 H_2O$ were stirred into 1500 ml of $H_2O$ and then completely dissolved after acidification with 180 g of $HNO_3$ (65% by weight, ρ=1.39 g/ml). 13.5 g of $Zr(SO_4)_2 \cdot 4H_2O$ were then added to this bismuth nitrate solution. Precipitation was carried out with a potassium vanadate solution which had been prepared by dissolving 31.4 g of commercial vanadium pentoxide (>99% by wt. $V_2O_5$) in 330 g of 50% potassium hydroxide solution (ρ=1.51 g/ml ). The time required for precipitation was 30 minutes. After precipitation, the gel was homogenised for 10 minutes by means of a high speed stirrer (e.g. mixing turbine of Kotthoff). During the precipitation and after-stirring time, the pH was adjusted to 3-4. From the quantities put into the process, the gel was calculated to have a molar composition of 0.9 $BiVO_4 \cdot 0.1 ZrO_2$ or 1 $BiVO_4 \cdot 0.11 ZrO_2$. The gel was separated from the mother liquor through a suction filter, stirred up once in distilled water and then again filtered. Drying was carried out in a drying cupboard at 120° C. The dried gel was tempered at 400° C. for 3 hours for pigment formation and the reaction product was then wet ground in a ball mill for 15 minutes. A very luminous yellow powder having a surface area (according to BET) of 16 $m^2/g$ was obtained after the gel had been rewashed, dried and dis-agglomerated in a cross beater mill. The analytically determined composition of the pigment (in molar ratios) was Bi : V : Zr=1 : 0.997 : 0.105. The reaction product showed the tetragonal structure of Scheelite with lattice constants of $a_o$=5.139Å and $c_o$=11.636Å. The colour values (in Alkydal ® F 48 resin (see above)) were as follows:

| L* = 86.1 | a* = −6.1 |
|---|---|
| C* = 82.2 | b* = 81.9. |

EXAMPLE 2

The present Example was carried out completely analogously to Example 1 with a molar gel composition of 0.9 $BiVO_4$·0.1 $ZrO_2$. This Example differed from Example 1 in that the annealing time was shorter. The gel was heated to 400° C. for 0.5 hours for pigment formation. After it had been worked up analogously to Example 1, a luminous yellow product having a surface area (according to BET) of 17 $m^2/g$ was obtained. The tetragonal crystal structure of the Schellite type had the grid constants $a_o=5.129Å$ and $c_o=11.661Å$. The colour values were as follows:

| | |
|---|---|
| $L^* = 85.5$ | $a^* = -6.5$ |
| $C^* = 80.3$ | $b^* = 80.0$ |

EXAMPLE 3

1940 g of $BiONO_3$ (80% $Bi_2O_3$) and 263 g of $Zr(SO_4)_2$·4 $H_2O$ were stirred into 20 liters of $H_2O$ and sufficient 65% $HNO_3$ were added to produce a clear solution. Precipitation was carried out with a potassium vanadate solution of 606 g of $V_2O_5$ in 6600 g of 50% potassium hydroxide solution with 200 ml of $H_2O$ and was completed within 10 minutes at pH =3.5. The reaction mixture containing the molar quantities of 0.9 $BiVO_4$·0.1 $ZrO_2$ was then worked up by a method completely analogous to that of Example 1. For pigment formation, the $BiVO_4$·$ZrO_2$ gel which had been dried at 120° C. was annealed at 400° C. for 0.5 hours. After the product obtained had been milled, dried and disagglomerated, a brilliant yellow substance having a surface area (according to BET) of 19 $m^2/g$ was obtained. The X-ray powder diagram showed the tetragonal crystal structure of Scheelite. The colour values were as follows:

| | |
|---|---|
| $L^* = 88.6$ | $a^* = -9.45$ |
| $C^* = 82.3$ | $b^* = 81.78$ |

EXAMPLE 4

This example illustrates the preparation of the pigment according to the invention with an increased zirconium content.

167.3 g of $Bi(NO_3)_3$·$5H_2O$ were dissolved by introduction into 1500 g of $H_2O$ acidified with 100 g of $HNO_3$ (65%, =1.39 g g/ml). 30.6 g of solid $Zr(SO_4)_2$·$4H_2O$ were stirred into the resulting solution. A potassium vanadate solution of 31.4 g of $V_2O_5$ (>99% by weight $V_2O_5$) in 190 g of 50% KOH (ρ1.51 g/ml) and 1500 ml of $H_2O$ were prepared for precipitation. The gel was precipitated all at once at pH=6. It was then homogenised by stirring with a Kotthoff mixing siren for 10 minutes. The quantities obtained corresponded to a molar gel composition of 1 $BiVO_4$·0.25 $ZrO_2$. The $BiVO_4/ZrO_2$ gel which had been dried at 120° C. was annealed at 400° C. (4 hours).

After it had been worked up into a pigment as in Examples 1 to 3, the substance had a surface area (according to BET) of 13 $m^2/g$. It showed the pure tetragonal crystal structure of Scheelite. Due to the higher zirconium content, the yellow tone was slightly paler and the colour values were shifted in the direction of red:

| | |
|---|---|
| $L^* = 84.5$ | $a^* = -5.3$ |
| $C^* = 77.5$ | $b^* = 77.3$ |

The zirconium rich $BiVO_4$ pigment prepared in the present Example manifests the high stability to sodium hydroxide solution according to the invention: When 15 g of the material prepared in the present Example is treated for 30 minutes at 100° C. in 150 ml of 11% sodium hydroxide solution, the tetragonal crystal structure is only slightly attacked. $BiVO_4$ is substantially unchanged after the NaOH treatment. When zirconium-free monoclinic $BiVO_4$ (for preparation see Example 7) is treated under the same conditions, the $BiVO_4$ structure is completely destroyed and is converted into various $Bi_2O_3$ modifications (mainly δ- and γ-$Bi_2O_3$) with release of vanadate.

EXAMPLE 5

The present Example shows that the substances according to the invention can no longer be obtained pure when the zirconium contents are greater than 0.3 Zr/1 $BiVO_4$ (molar).

Precipitation of the gel was carried out by a method completely analogous to that of Example 1 but in this case 52.5 g of solid $Zr(SO_4)_2$·$4H_2O$ were dissolved in the bismuth nitrate solution. The zirconium content was thus raised to 0.43 $ZrO_2/1$ $BiVO_4$ (molar). After the gel had been dried at 120° C., it was subjected to various annealing conditions summarized in Table 2. This summary shows that up to 350° C., no conversion to the $BiVO_4$ according to the invention takes place. Conversely, more intensive annealing conditions give rise to reaction products which are contaminated with unwanted foreign phases. At the same time, the colour values no longer correspond to the pure yellow tone of the pigments according to the invention. A marked colour shift into the red region with lowering of the yellow content takes place.

TABLE 2

Annealing of a gel precipitate having the composition $BiVO_4$·0.43 $ZrO_2$

| Example No. | Annealing conditions | | Main phase after X-ray diffractometry | Colour values | | | |
|---|---|---|---|---|---|---|---|
| | Time h | Temp. °C. | | $L^*$ | $C^*$ | $a^*$ | $b^*$ |
| 5 a | 1 | 250 | amorphous | 81.2 | 70.0 | −6.9 | 69.7 |
| 5 b | 1 | 300 | amorphous | 78.1 | 63.0 | −3.8 | 62.8 |
| 5 c | 1 | 350 | amorphous | 78.2 | 60.7 | −3.4 | 60.6 |
| 5 d | 16 | 400 | $BiVO_4$* + foreign phase | 82.8 | 78.9 | −4.0 | 78.8 |
| 5 e | 16 | 500 | $BiVO_4$* + foreign phase | 80.7 | 77.7 | −1.3 | 77.7 |

*monoclinic and tetragonal

EXAMPLE 6

The present Example shows that the $BiVO_4$ pigments with Scheelite structure according to the invention cannot be obtained when the quantity of zirconium is reduced to below the concentration given in the Patent Claims.

The experiment was carried out completely analogously to Example 1, using the quantities indicated there, but the quantity of $Zr(SO_4)_2$·4 $H_2O$ introduced into the $Bi(NO_3)_3$ solution was only 6.5 g. The molar ratio was therefore 1 $BiVO_4$·0.05 $ZrO_2$. After this low zirconium gel had been separated off, washed and dried, it was annealed at 400° C. for 2 hours. Only a very pale yellow pigment having the following colour values was obtained:

| | |
|---|---|
| $L^* = 87.6$ | $a^* = -7.3$ |
| $C^* = 59.7$ | $b^* = 59.3.$ |

X-ray powder analysis showed that the tetragonal Scheelite lattice structure according to the invention was not obtained. Instead, another tetragonal modification of $BiVO_4$ had formed, namely that of the zirconium type, which does not provide sufficient colour for use as pigment.

EXAMPLE 7

The present Example shows the high thermal stability of the yellow pigments according to the invention when used for colouring synthetic resins, compared with that of $BiVO_4$ pigments known in the art.

The material according to the invention was prepared by the standard method of Example 1, using a gel having the composition $0.9\ BiVO_4 \cdot 0.1\ ZrO_2$. After sharp suction filtration and drying (120° C.), the gel was tempered at 400° C. for 3 hours. After the material had been wet ground (15 minutes, ball mill), this pigment batch was found to have the following properties:

| | |
|---|---|
| Specific surface area (according to BET) | $7.9\ m^2/g$ |
| Structure | pure tetragonal Scheelite structure $a_o = 11.666$ Å $c_o = 5.124$ Å |
| Colour values | $L^* = 84.5$  $a^* = -4.6$ $C^* = 83.1$  $b^* = 83.0.$ |

COMPARISON SUBSTANCES

The material according to the invention was compared with a zirconium-free monoclinic $BiVO_4$ (Comparison substance I) and with a tetragonal $BiVO_4$ modified with $CaWO_4$ (Comparison substance II).

Comparison substance I

The procedure was completely analogous to that of Example 7 but no zirconium sulphate was added to the $Bi(NO_3)_3$ solution. After the gel had been precipitated, separated and dried, it was annealed at 400° C. for 3 hours. A yellow pigment having a specific surface area (according to BET) of $7.7\ m^2/g$ was obtained after grinding. This substance, however, did not have the tetragonal structure according to the invention. The X-ray powder diagram showed severe monoclinic splitting. The lattice constants were as follows:

$a_o = 5.193$ Å
$b_o = 11.712$ Å
$c_o = 5.096$ Å
$\alpha = 90.381°$

The colour values (determined in Alkydal® F 48) were as follows:

| | |
|---|---|
| $L^* = 88.4$ | $a^* = -11.0$ |
| $C^* = 83.4$ | $b^* = 82.6.$ |

Comparison substance II

The procedure in this case was again strictly in accordance with that of the preceding Example 7 but in this case no zirconium sulphate but 8.15 g of $Ca(NO_3)_2 \cdot 4H_2O$ were added to the bismuth nitrate solution (of 167.3 g of $Bi(NO_3)_3 \cdot 5\ H_2O$). 11.2 g of $K_2WO_4$ were accordingly added to the potassium vanadate solution (of 31.4 g of $V_2O_5$). The gel precipitated from these solutions has the molar composition of $BiVO_4 \cdot 0.1\ CaWO_4$. Separation, drying and annealing of the gel were carried out as above. The yellow pigment obtained, which had a dirty greenish tinge, was characterised by the following data:

| | |
|---|---|
| Specific surface area (according to BET) | $21\ m^2/g$ |
| Structure | pure tetragonal Scheelite structure $a_o = 5.5151$ Å $c_o = 11.639$ Å |
| Colour values | $L^* = 84.9$  $a^* = -8.3$ $C^* = 71.2$  $b^* = 70.7.$ |

The increased thermal stability of the pigments according to the invention in synthetic resins compared with the conventional substances based on $BiVO_4$ (Comparison substances I and II) is illustrated by the following test:

Heat resistance test

The three pigments to be compared were incorporated in Vestolen ® A 6016 in a quantity of 1% as pigment volume concentration (PVC) and subjected to a heat resistance test in an injection moulding machine.

For this test, samples were subjected to 220° C., 240° C., 260° C. and 280° C. in each case for 5 minutes, and the colour difference $\Delta E^*$ according to DIN 6174 (based on the plate which had been moulded at 200° C.) was determined.

Vestolen ® high pressure polyethylene of Hüls AG

The results are summarized in Table 3. These results show that the pigment according to the invention has a substantially better temperature stability in synthetic resin than the conventional pigments.

TABLE 3

Colour differences of various pigments based on $BiVO_4$ after subjection to heat in polyolefin

| $BiVO_4$ types investigated | Characteristic | Temp. | $\Delta E^*$ |
|---|---|---|---|
| Substance from Example 7 | tetragonal $BiVO_4$ with Scheelite structure according to the invention foreign ions: Zr | 220 240 260 280 | 1.5 2.6 5.2 10.2 |
| Comparison substance I | conventional monoclinic $BiVO_4$ foreign ions: none | 220 240 260 280 | 9.2 12.5 19.9 29.7 |
| Comparison substance II | conventional tetragonal $BiVO_4$ with Scheelite structure foreign ions: Ca, W | 220 240 260 280 | 6.5 8.2 10.3 14.3 |

[1] monoclinic and tetragonal

EXAMPLE 8

The substances used in Example 7 for the test for stability in synthetic resin were investigated for their sensitivity to light. Lacquered cards covered with 10% PVC in Alkydal ® F 48 lacquer (Purton) were exposed to the light of a UV lamp for 2 hours. The colour differences determined according to DIN 6174 between the exposed zone and a covered area of the lacquered card were as follows for the various pigments:

| Pigment | Characteristic | $\Delta E^*$ after exposure to light |
|---|---|---|
| Substance from Example 7 | Zr-containing $BiVO_4$ according to the invention | 0.7 |
| Comparison substance I | conventional monoclinic $BiVO_4$ | 1.2 |
| Comparison substance II | conventional tetragonal $BiVO_4$ containing $CaWO_4$ | 6.7 |

What is claimed is:

1. Bismuth vanadate pigments in the form of the tetragonal crystal structure of Scheelite, containing from 0.1 to 0.3 mol of $ZrO_x$, per mol of $BiVO_4$.

2. A process for the preparation of the bismuth vanadate pigments according to claim 1 wherein mixed precipitates of aqueous bismuth, vanadate and zirconium salts solutions are subjected to a heat treatment after they have been separated off, washed and dried, and thereafter ground to pigment fineness.

3. A process according to claim 2 wherein the heat treatment is carried out at temperatures of from 250° to 550° for periods of from 0.5 to 16 hours.

4. In an improved colored lacquer or colored synthetic plastics or resin colored by pigment, the improvement comprises said pigment being the pigment claimed in claim 1.

* * * * *